(12) United States Patent
Joseph et al.

(10) Patent No.: US 10,660,053 B2
(45) Date of Patent: May 19, 2020

(54) SEPARATE MEASUREMENT AND REPORTING FOR DIFFERENT TRANSMIT RECEIVE POINTS

(71) Applicant: QUALCOMM Incorporated, San Diego, CA (US)

(72) Inventors: Vinay Joseph, San Diego, CA (US); Chong Li, Weehawken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/050,291

(22) Filed: Jul. 31, 2018

(65) Prior Publication Data

US 2020/0045655 A1    Feb. 6, 2020

(51) Int. Cl.
| | |
|---|---|
| *H04W 4/00* | (2018.01) |
| *H04W 56/00* | (2009.01) |
| *H04B 17/309* | (2015.01) |
| *H04W 24/10* | (2009.01) |
| *H04B 7/06* | (2006.01) |

(52) U.S. Cl.
CPC ........ *H04W 56/001* (2013.01); *H04B 7/0617* (2013.01); *H04B 17/309* (2015.01); *H04W 24/10* (2013.01)

(58) Field of Classification Search
None
See application file for complete search history.

(56) References Cited

U.S. PATENT DOCUMENTS

| | | | |
|---|---|---|---|
| 2019/0124533 A1* | 4/2019 | Tenny | H04W 24/10 |
| 2019/0174439 A1* | 6/2019 | Tamrakar | H04W 56/001 |
| 2019/0238208 A1* | 8/2019 | Tang | H04B 7/0695 |

OTHER PUBLICATIONS

Ericsson: "Details of SS Beam Reporting Framework", 3GPP Draft; R1-1718744 Details of SS Beam Reporting Framework, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017, Oct. 8, 2017, XP051341914, 4 pages, Retrieved from the Internet http://www.3gpp.org/ftp/Meetings_3GPP_SYNC/RAN1/Docs [retrieved on Oct. 8, 2017] Chapters 1, 2, figure 1.

(Continued)

*Primary Examiner* — Clemence S Han
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment may measure one or more synchronization signal blocks (SSBs); determine that the one or more SSBs are associated with a first transmit receive point (TRP) based at least in part on identification information, associated with the one or more SSBs, that distinguishes the first TRP from a second TRP with a same physical cell identifier (PCI) as the first TRP; and transmit a measurement report, associated with the first TRP, based at least in part on measuring the one or more SSBs and determining that the one or more SSBs are associated with the first TRP. Numerous other aspects are provided.

30 Claims, 9 Drawing Sheets

(56) References Cited

OTHER PUBLICATIONS

Ericsson: "Quasi-co-location Information in SIBI and RRC Reconfiguration", 3GPP Draft; R2-1711372-Quasi-Co-Location Information in SIBI, 3rd Generation Partnership Project (3GPP), Mobile Competence Centre; 650, Route Des Lucioles; F-06921 Sophia-Antipolis Cedex; France, vol. RAN WG2, No. Prague, Czech Republic; Oct. 9, 2017-Oct. 13, 2017, Oct. 8, 2017, XP051343357, 4 Pages, Retrieved from the Internet http://www.3gpp.org/ftp/Meetings_3GPP_SYNC/RAN2/Docs/ [retrieved on Oct. 8, 2017].
International Search Report and Written Opinion—PCT/US2019/044221—ISA/EPO—dated Oct. 1, 2019.

* cited by examiner

SEPARATE MEASUREMENT AND REPORTING FOR DIFFERENT TRANSMIT RECEIVE POINTS

FIELD OF THE DISCLOSURE

Aspects of the present disclosure generally relate to wireless communication, and more particularly to techniques and apparatuses for separate measurement and reporting for different transmit receive points (TRPs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include measuring one or more synchronization signal blocks (SSBs); determining that the one or more SSBs are associated with a first transmit receive point (TRP) based at least in part on identification information, associated with the one or more SSBs, that distinguishes the first TRP from a second TRP with a same physical cell identifier (PCI) as the first TRP; and transmitting a measurement report, associated with the first TRP, based at least in part on measuring the one or more SSBs and determining that the one or more SSBs are associated with the first TRP.

In some aspects, a UE for wireless communication may include memory and one or more processors operatively coupled to the memory. The memory and the one or more processors may be configured to measure one or more synchronization signal blocks (SSBs); determine that the one or more SSBs are associated with a first transmit receive point (TRP) based at least in part on identification information, associated with the one or more SSBs, that distinguishes the first TRP from a second TRP with a same physical cell identifier (PCI) as the first TRP; and transmit a measurement report, associated with the first TRP, based at least in part on measuring the one or more SSBs and determining that the one or more SSBs are associated with the first TRP.

In some aspects, a non-transitory computer-readable medium may store one or more instructions for wireless communication. The one or more instructions, when executed by one or more processors of a UE, may cause the one or more processors to measure one or more synchronization signal blocks (SSBs); determine that the one or more SSBs are associated with a first transmit receive point (TRP) based at least in part on identification information, associated with the one or more SSBs, that distinguishes the first TRP from a second TRP with a same physical cell identifier (PCI) as the first TRP; and transmit a measurement report, associated with the first TRP, based at least in part on measuring the one or more SSBs and determining that the one or more SSBs are associated with the first TRP.

In some aspects, an apparatus for wireless communication may include means for measuring one or more synchronization signal blocks (SSBs); means for determining that the one or more SSBs are associated with a first transmit receive point (TRP) based at least in part on identification information, associated with the one or more SSBs, that distinguishes the first TRP from a second TRP with a same physical cell identifier (PCI) as the first TRP; and means for transmitting a measurement report, associated with the first TRP, based at least in part on measuring the one or more SSBs and determining that the one or more SSBs are associated with the first TRP.

In some aspects, a method of wireless communication, performed by a base station, may include generating one or more synchronization signal blocks (SSBs), associated with a first transmit receive point (TRP), to convey identification information for the first TRP, wherein the identification information distinguishes the first TRP from a second TRP with a same physical cell identifier (PCI) as the first TRP; transmitting the one or more SSBs associated with the first TRP; configuring a user equipment (UE) to measure and report the one or more SSBs; and receiving, from the UE, a measurement report associated with the first TRP based at least in part on transmitting the one or more SSBs and configuring the UE to measure and report the one or more SSBs.

In some aspects, a base station for wireless communication may include memory and one or more processors operatively coupled to the memory. The memory and the one or more processors may be configured to generate one or more synchronization signal blocks (SSBs), associated with a first transmit receive point (TRP), to convey identification information for the first TRP, wherein the identification information distinguishes the first TRP from a second TRP with a same physical cell identifier (PCI) as the first TRP; transmit the one or more SSBs associated with the first TRP; configure a user equipment (UE) to measure and report the one or more SSBs; and receive, from the UE, a measurement report associated with the first TRP based at least in part on transmitting the one or more SSBs and configuring the UE to measure and report the one or more SSBs.

In some aspects, a non-transitory computer-readable medium may store one or more instructions for wireless communication. The one or more instructions, when executed by one or more processors of a base station, may cause the one or more processors to generate one or more synchronization signal blocks (SSBs), associated with a first transmit receive point (TRP), to convey identification information for the first TRP, wherein the identification information distinguishes the first TRP from a second TRP with a same physical cell identifier (PCI) as the first TRP; transmit the one or more SSBs associated with the first TRP; configure a user equipment (UE) to measure and report the one or more SSBs; and receive, from the UE, a measurement report associated with the first TRP based at least in part on transmitting the one or more SSBs and configuring the UE to measure and report the one or more SSBs.

In some aspects, an apparatus for wireless communication may include means for generating one or more synchronization signal blocks (SSBs), associated with a first transmit receive point (TRP), to convey identification information for the first TRP, wherein the identification information distinguishes the first TRP from a second TRP with a same physical cell identifier (PCI) as the first TRP; means for transmitting the one or more SSBs associated with the first TRP; means for configuring a user equipment (UE) to measure and report the one or more SSBs; and means for receiving, from the UE, a measurement report associated with the first TRP based at least in part on transmitting the one or more SSBs and configuring the UE to measure and report the one or more SSBs.

Aspects generally include a method, apparatus, system, computer program product, non-transitory computer-readable medium, user equipment, base station, transmit receive point (TRP), wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
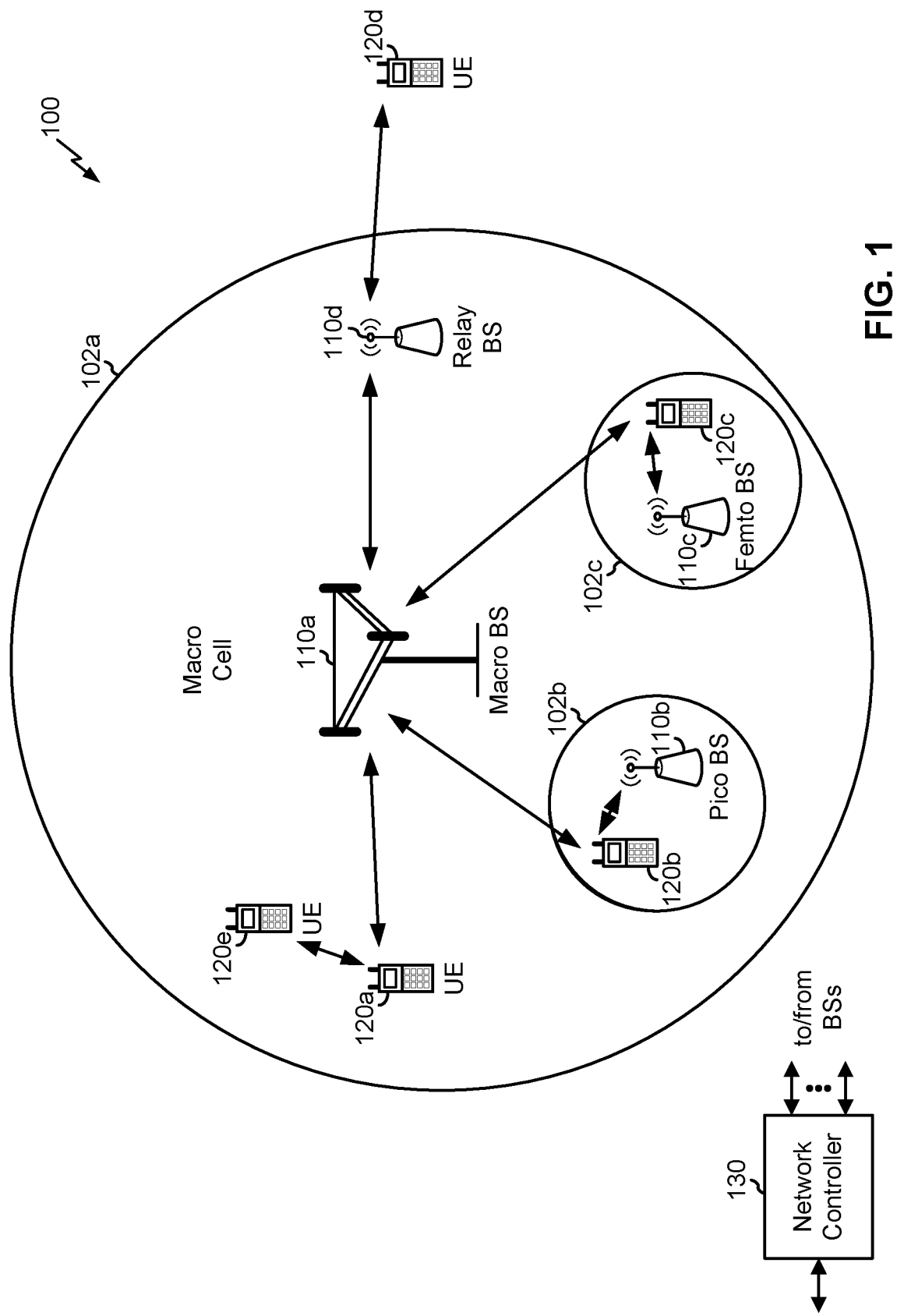
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
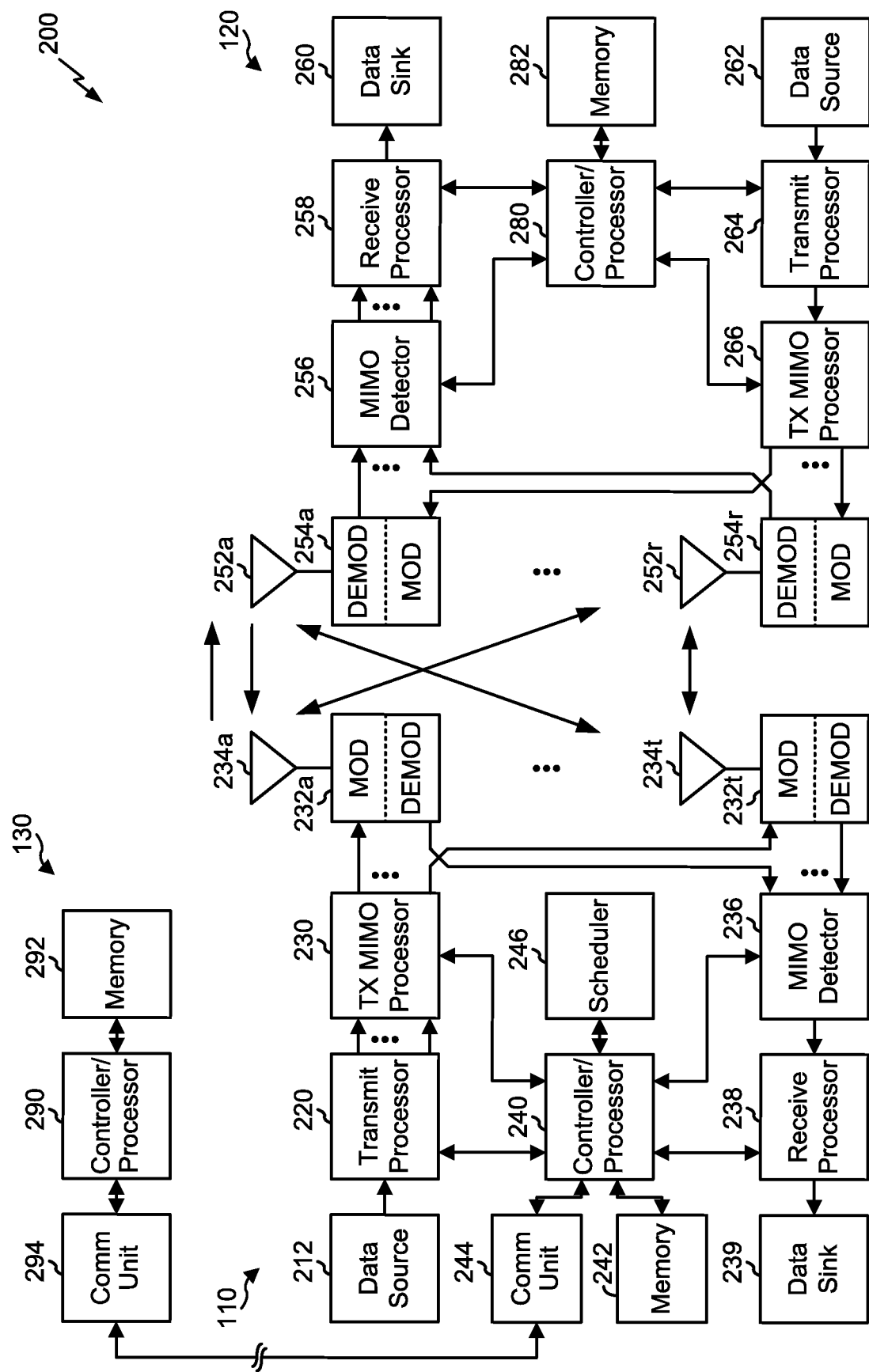
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with separate measurement and reporting for different transmit receive points (TRPs), as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for measuring one or more synchronization signal blocks (SSBs); means for determining that the one or more SSBs are associated with a first transmit receive point (TRP) based at least in part on identification information, associated with the one or more SSBs, that distinguishes the first TRP from a second TRP with a same physical cell identifier (PCI) as the first TRP; means for transmitting a measurement report, associated with the first TRP, based at least in part on measuring the one or more SSBs and determining that the one or more SSBs are associated with the first TRP; and/or the like. In some aspects, such means may include one or more components of UE 120 described in connection with FIG. 2.

In some aspects, base station 110 may include means for generating one or more synchronization signal blocks (SSBs), associated with a first transmit receive point (TRP), to convey identification information for the first TRP, wherein the identification information distinguishes the first TRP from a second TRP with a same physical cell identifier (PCI) as the first TRP; means for transmitting the one or more SSBs associated with the first TRP; means for configuring a user equipment (UE) to measure and report the one or more SSBs; means for receiving, from the UE, a measurement report associated with the first TRP based at least in part on transmitting the one or more SSBs and configuring the UE to measure and report the one or more SSBs; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
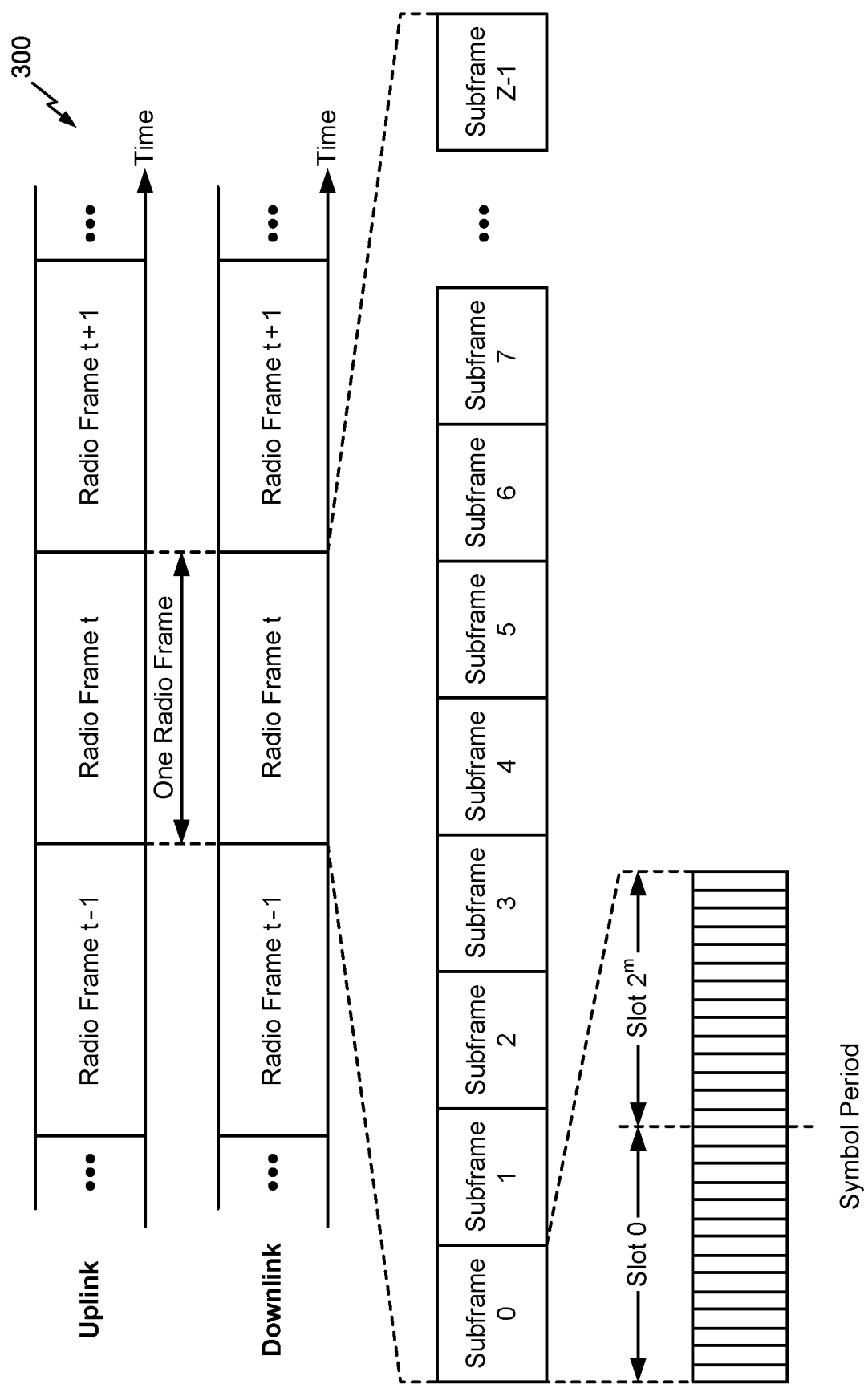
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^n$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
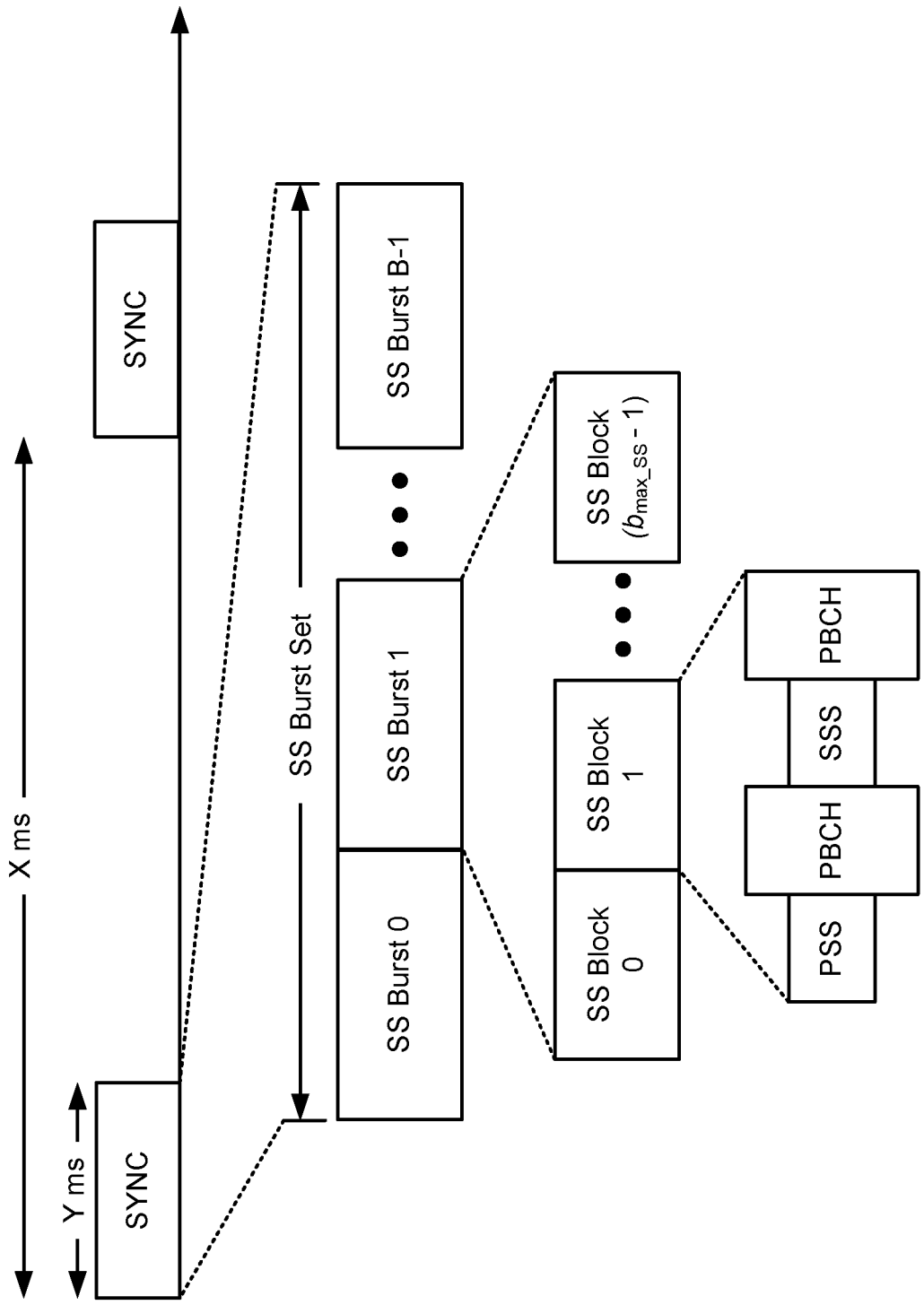
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples are possible and may differ from what was described with regard to FIGS. 3A and 3B.

Figure 4:
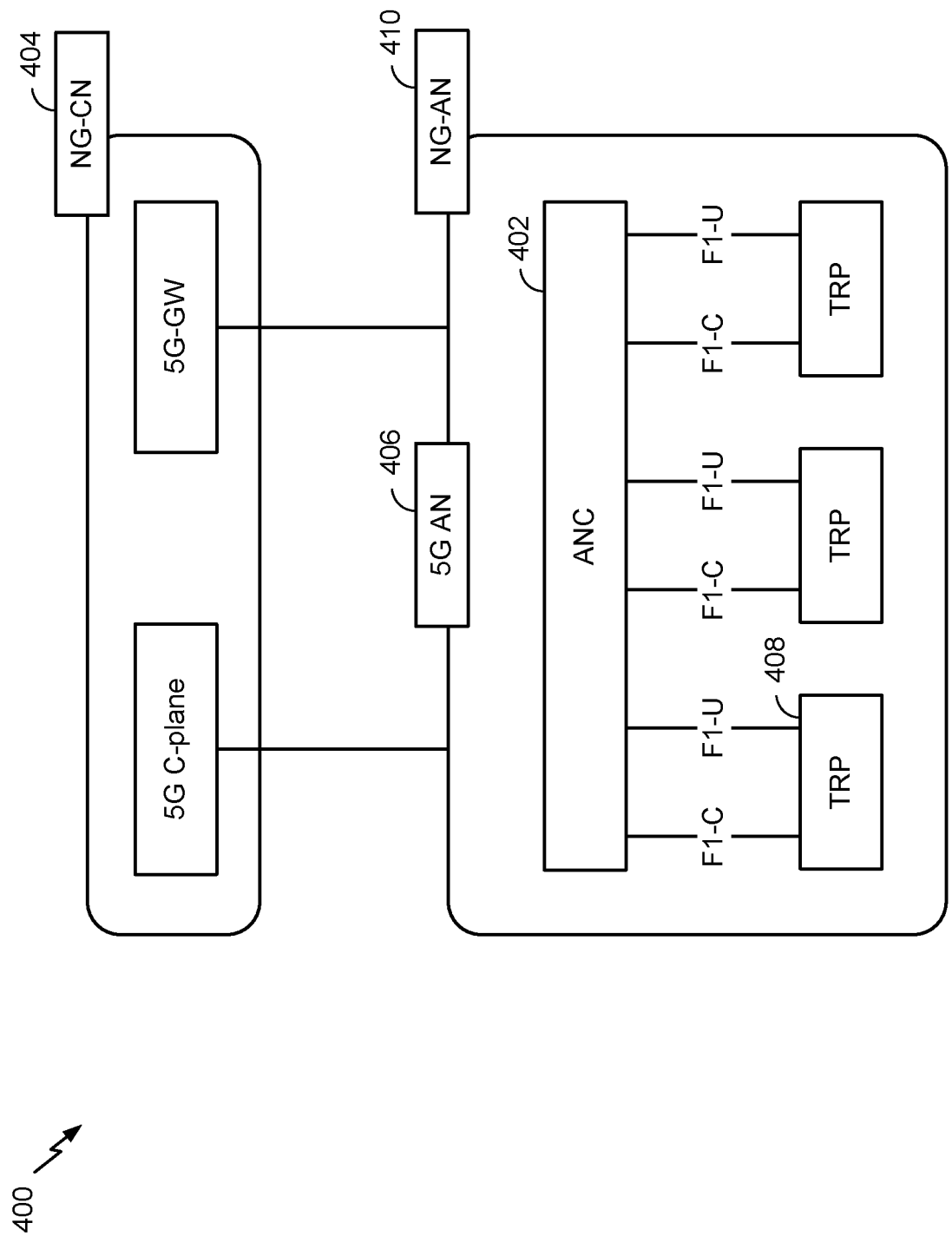
FIG. 4 illustrates an example logical architecture of a distributed radio access network (RAN), in accordance with various aspects of the present disclosure.

FIG. 4 illustrates an example logical architecture of a distributed RAN 400, according to aspects of the present disclosure. A 5G access node 406 may include an access node controller (ANC) 402. The ANC may be a central unit (CU) of the distributed RAN 400. The backhaul interface to the next generation core network (NG-CN) 404 may terminate at the ANC. The backhaul interface to neighboring next generation access nodes (NG-ANs) may terminate at the ANC. The ANC may include one or more TRPs 408 (which may also be referred to as BSs, NR BSs, Node Bs, 5G NBs, APs, gNB, or some other term). As described above, a TRP may be used interchangeably with "cell." In some aspects, different TRPs 408 may be associated with the same base station 110. For example, a TRP may be a distributed unit (DU) associated with the base station 110 (e.g., a gNB and/or the like), and/or may perform a subset of functionality (e.g., only physical (PHY) layer functionality) of the base station 110. In some aspects, different TRPs may be associated with different base stations 110.

The TRPs 408 may be a distributed unit (DU). The TRPs may be connected to one ANC (ANC 402) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 410 may support dual connectivity with NR. The NG-AN may share a common fronthaul for LTE and NR.

The architecture may enable cooperation between and among TRPs 408. For example, cooperation may be preset within a TRP and/or across TRPs via the ANC 402. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 402) and/or one or more distributed units (e.g., one or more TRPs 408).

Figure 5:
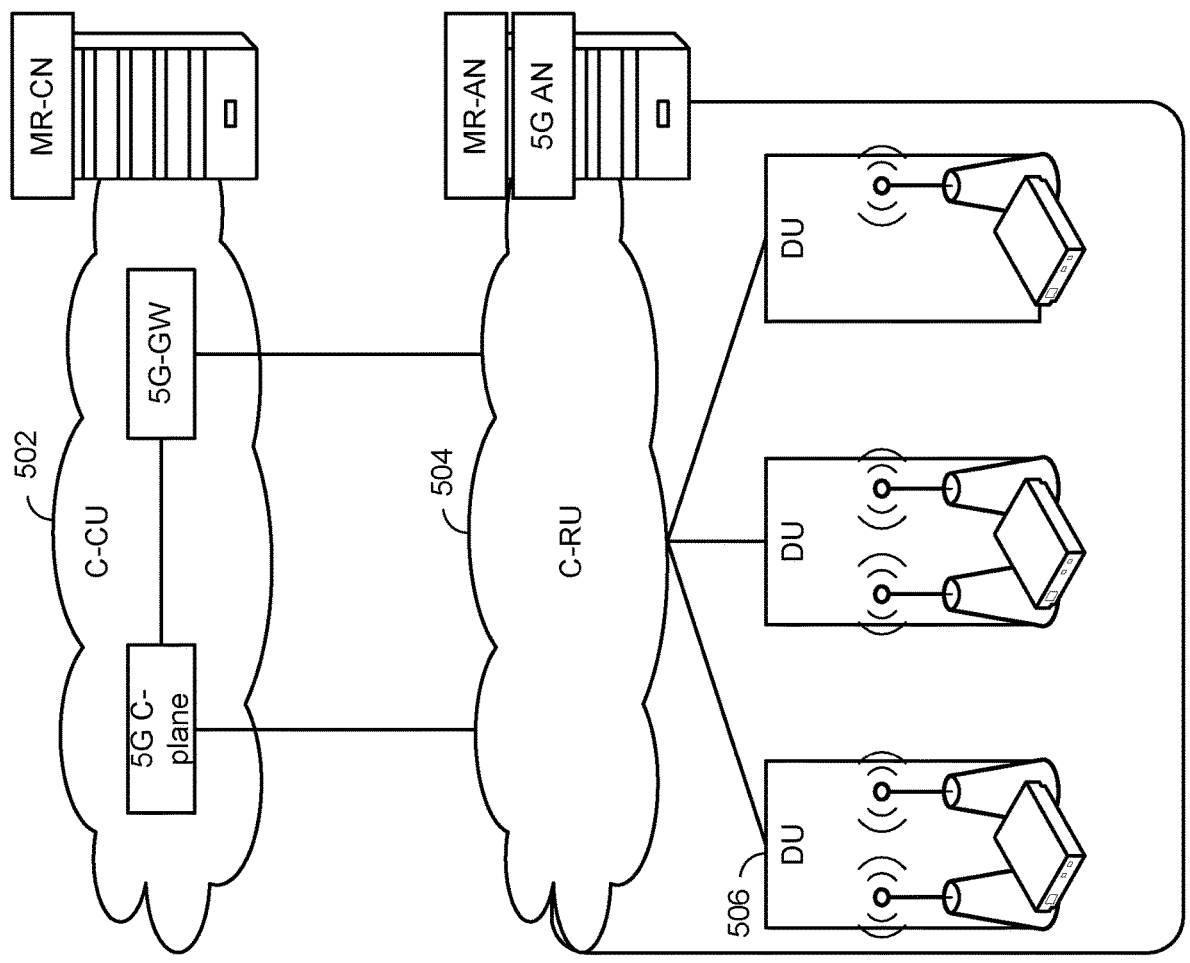
FIG. 5 illustrates an example physical architecture of a distributed RAN, in accordance with various aspects of the present disclosure.

As indicated above, FIG. 5 is provided merely as an example. Other examples are possible and may differ from what was described with regard to FIG. 5.

FIG. 5 illustrates an example physical architecture of a distributed RAN 500, according to aspects of the present disclosure. A centralized core network unit (C-CU) 502 may host core network functions. The C-CU may be centrally deployed. C-CU functionality may be offloaded (e.g., to advanced wireless services (AWS)), in an effort to handle peak capacity.

A centralized RAN unit (C-RU) 504 may host one or more ANC functions. Optionally, the C-RU may host core network functions locally. The C-RU may have distributed deployment. The C-RU may be closer to the network edge.

A distributed unit (DU) 506 may host one or more TRPs. The DU may be located at edges of the network with radio frequency (RF) functionality.

As indicated above, FIG. 5 is provided merely as an example. Other examples are possible and may differ from what was described with regard to FIG. 5.

Figure 6:
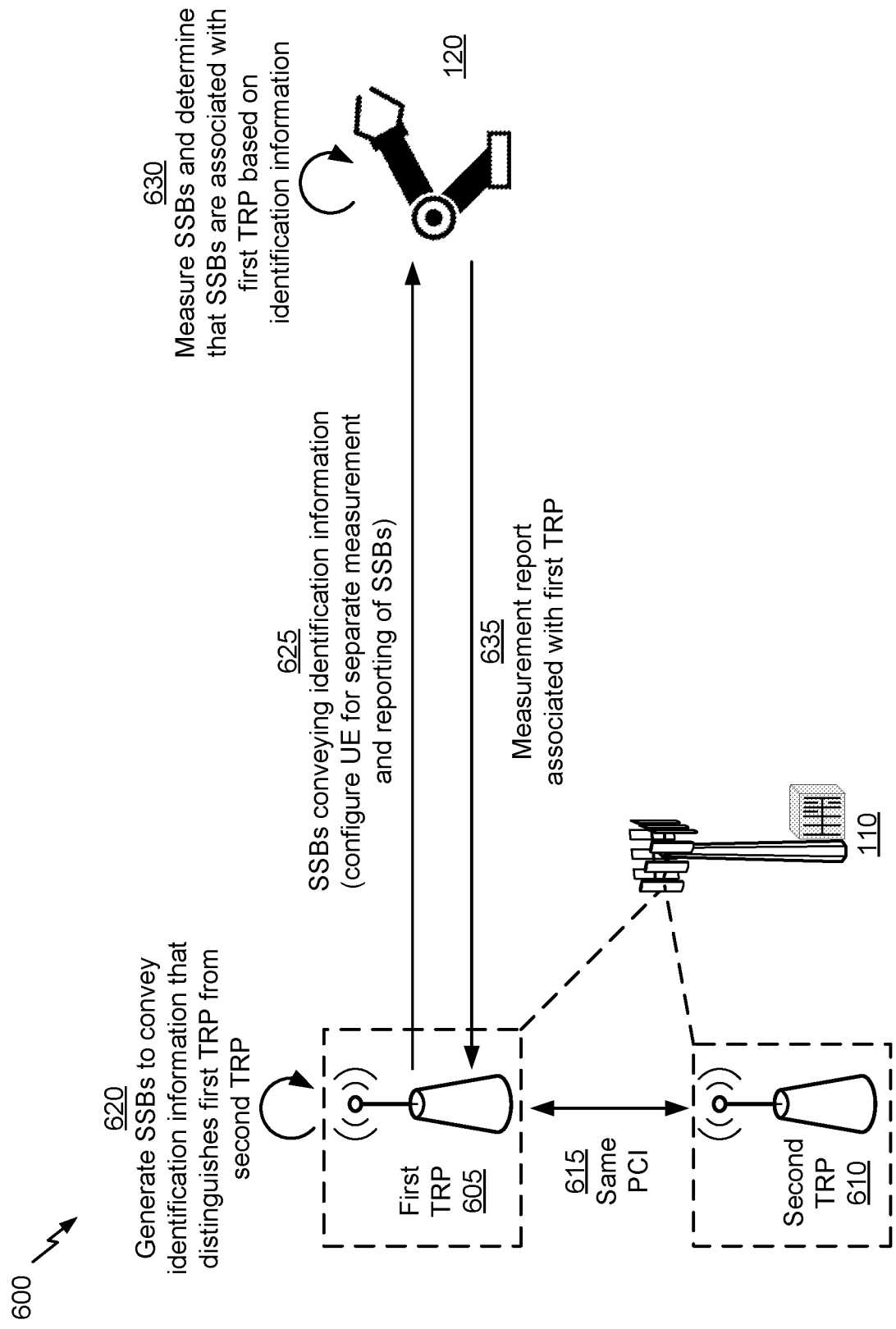
FIG. 6 is a diagram illustrating an example of separate measurement and reporting for different transmit receive points (TRPs), in accordance with various aspects of the present disclosure.

FIG. 6 is a diagram illustrating an example 600 of separate measurement and reporting for different TRPs, in accordance with various aspects of the present disclosure.

As shown in FIG. 6, a UE 120 (e.g., an MTC UE and/or the like, shown as a robotic arm) may be capable of communicating with multiple TRPs (e.g., multiple base stations 110, multiple antennas 234 and/or antenna arrays of a base station 110, multiple TRPs 408, multiple DUs 506, and/or the like). The multiple TRPs may be included in a coordinated multipoint network, which may be used to send information to the UE 120 and/or receive information from the UE 120 via multiple TRPs to improve performance (e.g., in case of dynamic network conditions, poor network conditions, and/or the like).

For example, a cluster of TRPs may be used to serve the UE 120 to provide spatial diversity, reduce latency, improve reliability, enable ultra-reliable low-latency communication (URLLC) requirements to be satisfied (e.g., in a factory automation setting and/or another setting), and/or the like. Due to changing radio conditions, the cluster of TRPs may need to be updated dynamically, such as by adding TRPs with good radio conditions to the cluster, removing TRPs with poor radio conditions from the cluster, maintaining TRPs with good radio conditions in the cluster, and/or the like. To determine the radio conditions associated with a TRP, the UE 120 may measure one or more SSBs (e.g., including a PSS, SSS, and/or PBCH, as described above in connection with FIG. 3B), and may transmit a measurement report based at least in part on such measurements. For example, the UE 120 may report a parameter that indicates a radio condition, such as an RSRP parameter, an RSRQ parameter, an RSSI parameter, a CQI parameter, and/or the like. A network controller may use the reported parameter(s) to adjust the cluster of TRPs that communicates with the UE 120, to modify one or more characteristics of one or more TRPs (e.g., a beamforming parameter, a transmit power, and/or the like), and/or to perform other operations to improve communication with the UE 120.

In some cases, a physical cell identifier (PCI) (also referred to as a physical cell identity) may be used to identify a TRP so that SSBs and/or measurement reports can be tied to the TRP. However, in some cases, multiple TRPs may be associated with the same PCI, and these multiple TRPs may not be distinguishable from one another. In this case, since reported radio conditions cannot be tied to a particular TRP, the network controller cannot determine which TRP(s) to add to the cluster, remove from the cluster, maintain in the cluster, and/or the like. Some techniques and apparatuses described herein permit identification of individual TRP(s) using identification information that uniquely distinguishes a TRP from other TRPs associated with the same PCI. In this way, a network may be modified to improve performance based at least in part on characteristic(s) of individual TRPs.

As shown in FIG. 6, the UE 120 may be capable of communicating with multiple TRPs, shown as a first TRP 605 and a second TRP 610. As shown by reference number 615, the first TRP 605 and the second TRP 610 may be associated with the same PCI. In some aspects, the first TRP 605 and the second TRP 610 may be associated with the same base station 110, and may be identified using the same PCI. For example, the TRPs 605, 610 may be distributed units (DUs) 506 associated with the same base station 110 (e.g., a C-RU 504) and/or may be different TRPs 408 of an ANC 402. Additionally, or alternatively, the TRPs 650, 610 may each perform a subset of functionality (e.g., only PHY layer functionality) for the base station 110. In some aspects, the first TRP 605 and the second TRP 610 may be associated with different base stations 110, but may be identified using the same PCI.

As shown by reference number 620, a base station 110 (e.g., using a first TRP 605) may generate one or more SSBs associated with the first TRP 605. When generating such an SSB, the base station 110 may generate the SSB to convey identification information for the first TRP 605. The identification information may individually identify the first TRP 605 from a group of TRPs associated with the same PCI. For example, the identification information may distinguish the first TRP 605 from the second TRP 610 (and/or one or more other TRPs) having the same PCI as the first TRP 605.

In some aspects, the identification information is an explicit identifier, and the identification information may be conveyed by including the explicit identifier in the one or more SSBs. For example, one or more bits of an SSB may be set (e.g., in a particular field of the SSB) to explicitly identify the TRP with which the SSB is associated. In some aspects, the identification information may be referred to as a physical layer (PHY) identifier (ID), and the one or more bits of the SSB may be set in a PHY ID field of the SSB.

Additionally, or alternatively, the identification information may be conveyed using one or more signal parameters of the one or more SSBs. For example, a signal parameter used to generate an SSB (e.g., a PSS, an SSS, and/or a PBCH) may be selected to indicate the specific TRP with which the SSB is associated. For example, the signal parameter may include a sequence generation parameter (e.g., a base sequence and/or the like) used to generate the PSS, the SSS, and/or the PBCH for the SSB. In this case, the identification information may be used as an input to the process used to generate one or more sequences for the SSB.

Additionally, or alternatively, the identification information may be conveyed using a timing offset of the SSBs, a periodicity of the SSBs, and/or the like. For example, different SSBs with different timing offsets (e.g., time division multiplexing (TDM) offsets) from a reference timing may be associated with different TRPs. Additionally, or alternatively, different SSBs having different periodicities between consecutive SSBs may be associated with different TRPs. In this case, the base station 110 may generate SSBs for transmission such that the SSBs are scheduled to have a timing offset and/or a periodicity that conveys the identification information (e.g., a TRP-specific identifier).

In some aspects, multiple of the above techniques (e.g., an explicit identifier, one or more signal parameters, a timing offset, a periodicity, and/or the like) may be combined to convey the identification information that distinguishes between multiple TRPs having the same PCI. In some aspects, an SSB associated with a TRP may convey both the PCI and the identification information associated with the TRP. Thus, the identification information may be different from the PCI, and may be used to distinguish the TRP from one or more other TRPs having the same PCI.

Furthermore, the identification information for a TRP may be different from a beam identifier associated with the TRP. For example, the base station 110 may transmit one or more SSBs, associated with the first TRP 605, using a first beam configuration associated with the first TRP 605. The first beam configuration may be independent from a second beam configuration associated with the second TRP 610. Thus, the identification information may distinguish between multiple TRPs regardless of the beam configuration(s) associated with those TRPs.

As shown by reference number 625, the base station 110 may transmit, and the UE 120 may receive, the one or more SSBs. For example, the one or more SSBs may be transmitted and/or received as described above in connection with FIG. 3B. Additionally, or alternatively, the one or more SSBs may be transmitted to convey the identification information for the first TRP 605, such as by including an explicit identifier that identifies the first TRP 605 in the one or more SSBs, generating the one or more SSBs using one or more signal parameters to identify the first TRP 605, transmitting the one or more SSBs with a timing offset and/or a periodicity that identifies the first TRP 605, and/or the like.

As further shown, in some aspects, the base station 110 may configure the UE 120 to separately measure the SSBs associated with the first TRP 605 and/or to separately report a measurement report associated with the first TRP 605. For example, the base station 110 may transmit an indication to separately measure SSBs corresponding to different TRPs, to separately report SSB measurements corresponding to different TRPs, and/or the like. In some aspects, the indication may be PCI-specific, and may indicate a PCI for which the UE 120 is to separately measure SSBs and/or report SSB measurements for TRPs having that PCI. For example, the base station 110 may indicate that the UE 120 is to separately measure SSBs and/or separately report SSB measurements for TRPs associated with a specific PCI. In this way, the network may control TRP clusters with finer granularity. In some aspects, the indication may be transmitted in a radio resource control (RRC) message, in a non-access stratum (NAS) message, in a media access control (MAC) control element (CE), in downlink control information (DCI), and/or the like.

In some aspects, an indication to separately measure SSBs associated with different TRPs having the same PCI may be indicated in a measurement configuration. Additionally, or alternatively, the measurement configuration may include information that identifies the TRPs for which the SSBs are to be measured (e.g., using one or more PCIs and/or one or more TRP-specific identifiers), a sub-carrier spacing for the SSBs, timing properties (e.g., a timing offset, a periodicity, and/or the like) for measuring the SSBs, and/or the like. As indicated above, the measurement configuration may be indicated, for example, in an RRC message, in a NAS message, in a MAC CE, in DCI, and/or the like.

In some aspects, an indication to separately report SSB measurements corresponding to different TRPs may be indicated in a reporting configuration. Additionally, or alternatively, the reporting configuration may include information that identifies the TRPs for which the SSB measurements are to be reported (e.g., using one or more PCIs and/or one or more TRP-specific identifiers), a type of message to be used for reporting (e.g., an RRC message, a layer 1 (L1) message, a channel state information (CSI) report, a layer 2 (L2) message, a MAC CE message, and/or the like), timing properties (e.g., a timing offset, a periodicity, and/or the like) for reporting the SSBs measurements (e.g., which may be different from the timing properties for measuring the SSBs), and/or the like. As indicated above, the reporting configuration may be indicated, for example, in an RRC message, in a NAS message, in a MAC CE, in DCI, and/or the like.

In some aspects, the UE 120 may transmit, in a UE capability report, an indication of whether the UE 120 supports separate measuring of SSBs and/or separate reporting of SSB measurements for different TRPs associated with the same PCI. If the UE 120 transmits an indication that the UE 120 supports such a capability, then the base station 110 may have the option of configuring the UE 120 to separately measure SSBs and/or separately report SSB measurements, as described above. However, if the UE 120 transmits an indication that the UE 120 does not support such a capability, then the base station 110 may not be permitted to configure the UE 120 to separately measure SSBs and/or separately report SSB measurements.

As shown by reference number 630, the UE 120 may measure the SSBs, and may determine that the SSBs are associated with the first TRP 605 based at least in part on the identification information conveyed by the SSBs. As indicated above, the identification information may distinguish the first TRP 605 from the second TRP 610 having the same PCI. In this way, the UE 120 may generate and transmit a measurement report specific to the first TRP 605.

In some aspects, the UE 120 may determine that the SSBs are associated with the first TRP 605 based at least in part on reading an explicit identifier included in the SSBs. Additionally, or alternatively, the UE 120 may determine that the SSBs are associated with the first TRP 605 based at least in part on computing one or more signal parameters, and determining which signal parameter(s) were most likely used to generate the SSBs. The signal parameter(s) most likely used to generate the SSBs may be used to distinguish the first TRP 605 from the second TRP 610 and/or one or more other TRPs having the same PCI as the first TRP 605. Additionally, or alternatively, the UE 120 may determine that the SSBs are associated with the first TRP 605 based at least in part on a transmission pattern and/or a reception pattern associated with the SSBs (e.g., a timing offset, a periodicity, and/or the like, as described above). Such a pattern may distinguish the first TRP 605, as described above.

As shown by reference number 635, the UE 120 may transmit, and the base station 110 (e.g., the first TRP 605) may receive, a measurement report associated with the first TRP 605 (e.g., specific to the first TRP 605). In some aspects, the UE 120 may generate the measurement report based at least in part on measuring the SSBs specific to the first TRP 605 and determining that the SSBs are specific to the first TRP 605 using the identification information conveyed by the SSBs. Additionally, or alternatively, the UE 120 may generate the measurement report based at least in part on being configured to separately measure SSBs and/or separately report SSB measurements (e.g., for a PCI associated with the first TRP 605 and the second TRP 610).

In some aspects, the measurement report may include an identifier that identifies the first TRP 605 and distinguishes the first TRP 605 from the second TRP 610 and/or one or more other TRPs having the same PCI as the first TRP 605. In some aspects, the identifier included in the measurement report may be the same as an explicit identifier (e.g., a PHY ID) included in the one or more SSBs. In some aspects, the measurement report may include both the identifier and the PCI. Thus, the identifier may be different from the PCI, and may be used to distinguish the TRP from one or more other TRPs having the same PCI.

The measurement report may indicate a radio condition specific to the first TRP 605 (e.g., between the first TRP 605 and the UE 120). For example, the measurement report may include an RSRP parameter specific to the first TRP 605 (e.g., rather than specific to the PCI shared by the first TRP 605 and the second TRP 610), an RSRQ parameter specific to the first TRP 605, an RSSI parameter specific to the first TRP 605, a CQI parameter specific to the first TRP 605, and/or the like. In some aspects, a network controller may use the reported parameter(s) to adjust a cluster of TRPs that communicates with the UE 120 (e.g., to add the first TRP 605 to the cluster, to remove the first TRP 605 from the cluster, to maintain the first TRP 605 in the cluster, and/or the like), to modify one or more characteristics specific to the first TRP 605 (e.g., a beamforming parameter, a transmit power, a modulation and coding scheme (MCS), one or more transmission parameters, and/or the like), and/or to perform other operations to improve communication with the UE 120.

In some aspects, the UE 120 may transmit the measurement report to the base station 110 using an RRC message, a layer 1 (L1) message (e.g., a channel state information (CSI) report and/or the like), a layer 2 (L2) message, and/or the like. In some aspects, a single message (e.g., of one of these types) may include a single measurement report (e.g., for a specific TRP). In some aspects, a single message may include multiple measurement reports, either for a specific TRP or for multiple TRPs. In some aspects, a single message may include measurement reports for all TRPs associated with the same PCI. For example, a single message may include a measurement report for the first TRP 605 and the second TRP 610.

In some aspects, the base station 110 and the UE 120 may perform similar operations for the second TRP 610. For example, the base station 110 may generate and transmit one or more second SSBs that convey second identification information that identifies the second TRP 610 and distinguishes the second TRP 610 from the first TRP 605 and/or one or more other TRPs associated with the same PCI as the second TRP 610. The UE 120 may measure the one or more second SSBs, may determine that the one or more second SSBs are associated with the second TRP 610 based at least in part on the second identification information, and may transmit a second measurement report associated with the second TRP 610 based at least in part on measuring the one or more second SSBs and determining that the one or more second SSBs are associated with the second TRP 610. In this way, individual TRPs having the same PCI may be distinguished from one another, thereby permitting TRP-specific network configurations and/or modifications to be performed.

As indicated above, FIG. 6 is provided as an example. Other examples are possible and may differ from what was described with respect to FIG. 6.

Figure 7:
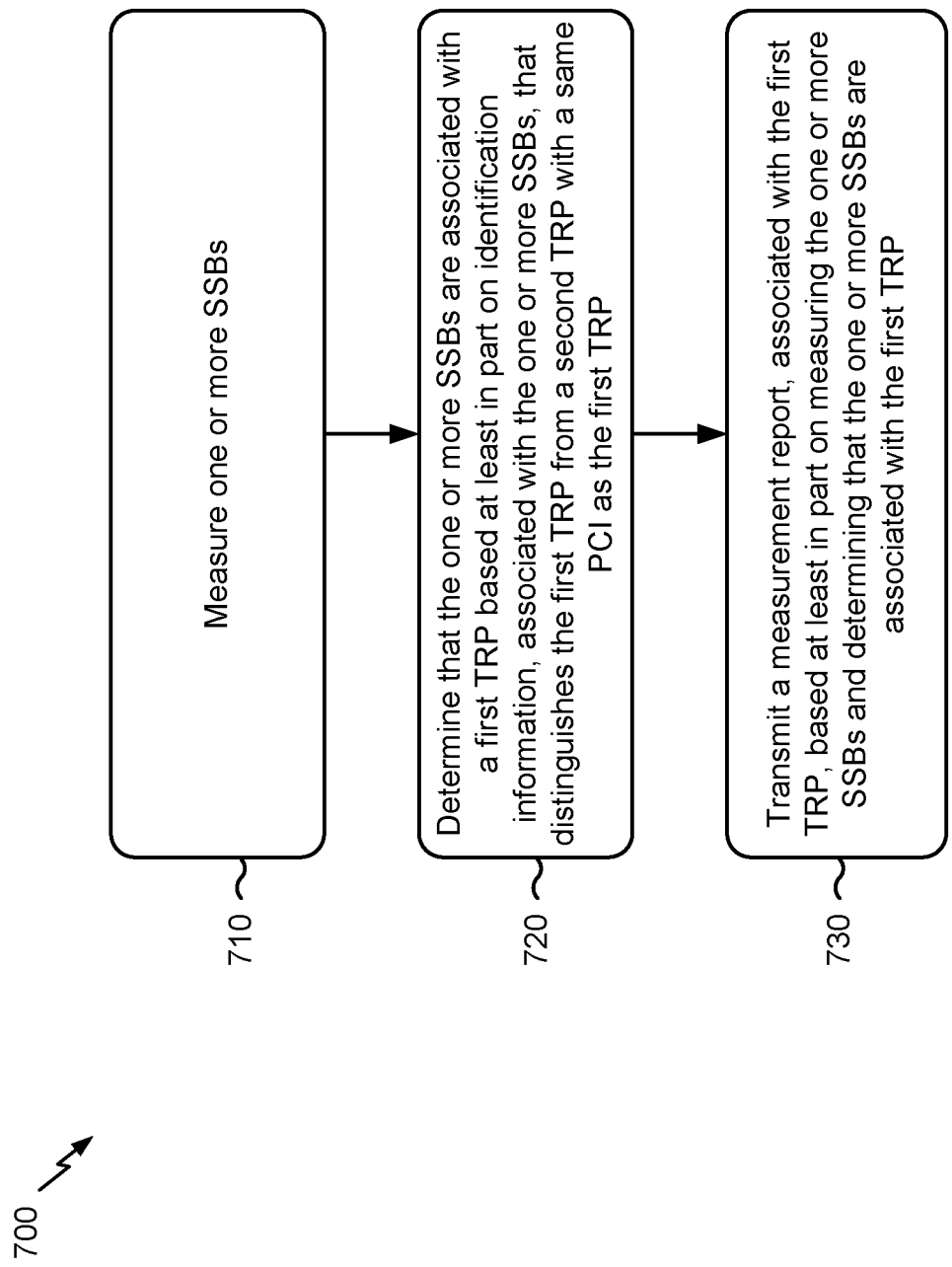
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120 and/or the like) performs operations associated with separate measurement and reporting for different TRPs.

As shown in FIG. 7, in some aspects, process 700 may include measuring one or more synchronization signal blocks (SSBs) (block 710). For example, the UE (e.g., using antenna 252, DEMOD 254, MIMO detector 256, receive processor 258, controller/processor 280, and/or the like) may measure one or more SSBs, as described above in connection with FIG. 6.

As further shown in FIG. 7, in some aspects, process 700 may include determining that the one or more SSBs are associated with a first transmit receive point (TRP) based at least in part on identification information, associated with the one or more SSBs, that distinguishes the first TRP from a second TRP with a same physical cell identifier (PCI) as the first TRP (block 720). For example, the UE (e.g., using controller/processor 280 and/or the like) may determine that the one or more SSBs are associated with a first TRP based at least in part on identification information, associated with the one or more SSBs, that distinguishes the first TRP from a second TRP with a same PCI as the first TRP, as described above in connection with FIG. 6.

As further shown in FIG. 7, in some aspects, process 700 may transmitting a measurement report, associated with the first TRP, based at least in part on measuring the one or more SSBs and determining that the one or more SSBs are associated with the first TRP (block 730). For example, the UE (e.g., using controller/processor 280, transmit processor 264, TX MIMO processor 266, MOD 254, antenna 252, and/or the like) may transmit a measurement report, associated with the first TRP, based at least in part on measuring the one or more SSBs and determining that the one or more SSBs are associated with the first TRP, as described above in connection with FIG. 6.

Process 700 may include additional aspects, such as any single aspect or any combination of aspects described below and/or in connection with one or more other processes described elsewhere herein.

In some aspects, the identification information is determined based at least in part on an explicit identifier included in the one or more SSBs. In some aspects, the identification information is determined based at least in part on one or more signal parameters of the one or more SSBs. In some aspects, the identification information is determined based at least in part on one or more of: a timing offset of the one or more SSBs, a periodicity of the one or more SSBs, or a combination thereof. In some aspects, the identification information is determined based at least in part on at least one of: an explicit identifier included in the one or more SSBs, one or more signal parameters of the one or more SSBs, a timing offset of the one or more SSBs, a periodicity of the one or more SSBs, or a combination thereof.

In some aspects, the identification information is not a PCI of the first TRP and is not a beam identifier associated with the first TRP. In some aspects, an identifier, that identifies the first TRP and distinguishes the first TRP from the second TRP, is included in the measurement report. In some aspects, the identifier and the PCI are included in the measurement report.

In some aspects, the measurement report is a first measurement report; and a second measurement report, associated with the second TRP, is transmitted based at least in part on measuring one or more other SSBs associated with the second TRP. In some aspects, the UE is configured to transmit the measurement report associated with the first TRP based at least in part on receiving an indication to separately report SSB measurements, corresponding to different TRPs, for the PCI. In some aspects, the UE is configured to transmit, in a UE capability report, an indication of whether the UE supports separate measuring and separate reporting of SSB measurements for different TRPs with a same PCI.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
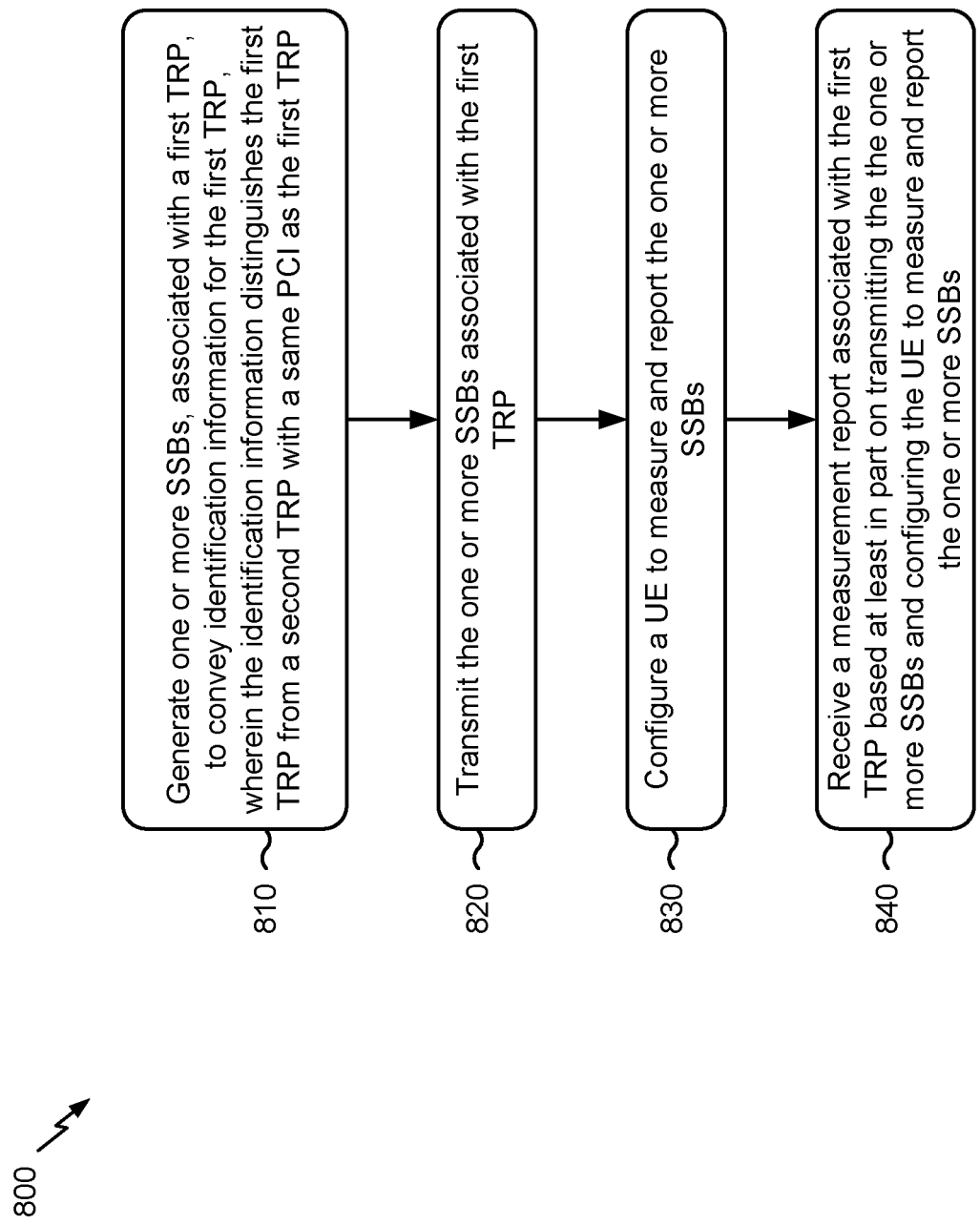
FIG. 8 is a diagram illustrating an example process performed, for example, by a base station and/or TRP, in accordance with various aspects of the present disclosure.

FIG. 8 is a diagram illustrating an example process 800 performed, for example, by a base station, in accordance with various aspects of the present disclosure. Example process 800 is an example where a base station (e.g., base station 110, TRP 408, TRP 605, TRP 610, and/or the like) performs operations associated with separate measurement and reporting for different TRPs.

As shown in FIG. 8, in some aspects, process 800 may include generating one or more synchronization signal blocks (SSBs), associated with a first transmit receive point (TRP), to convey identification information for the first TRP, wherein the identification information distinguishes the first TRP from a second TRP with a same physical cell identifier (PCI) as the first TRP (block 810). For example, the base station (e.g., using controller/processor 240, transmit processor 220, TX MIMO processor 230, MOD 232, antenna 234, and/or the like) may generate one or more SSBs, associated with a first TRP, to convey identification information for the first TRP, wherein the identification information distinguishes the first TRP from a second TRP with a same PCI as the first TRP, as described above in connection with FIG. 6.

As further shown in FIG. 8, in some aspects, process 800 may include transmitting the one or more SSBs associated with the first TRP (block 820). For example, the base station (e.g., using controller/processor 240, transmit processor 220, TX MIMO processor 230, MOD 232, antenna 234, and/or the like) may transmit the one or more SSBs associated with the first TRP, as described above in connection with FIG. 6.

As further shown in FIG. 8, in some aspects, process 800 may include configuring a user equipment (UE) to measure and report the one or more SSBs (block 830). For example, the base station (e.g., using controller/processor 240, transmit processor 220, TX MIMO processor 230, MOD 232, antenna 234, and/or the like) may configure a UE to measure and report the one or more SSBs, as described above in connection with FIG. 6.

As further shown in FIG. 8, in some aspects, process 800 may include receiving, from the UE, a measurement report associated with the first TRP based at least in part on transmitting the one or more SSBs and configuring the UE to measure and report the one or more SSBs (block 840). For example, the base station (e.g., using antenna 234, DEMOD 232, MIMO detector 236, receive processor 238, controller/processor 240, and/or the like) may receive, from the UE, a measurement report associated with the first TRP based at least in part on transmitting the one or more SSBs and configuring the UE to measure and report the one or more SSBs, as described above in connection with FIG. 6.

Process 800 may include additional aspects, such as any single aspect or any combination of aspects described below and/or in connection with one or more other processes described elsewhere herein.

In some aspects, the identification information is conveyed using an explicit identifier included in the one or more SSBs. In some aspects, the identification information is conveyed using one or more signal parameters of the one or more SSBs. In some aspects, the identification information is conveyed using one or more of: a timing offset of the one or more SSBs, a periodicity of the one or more SSBs, or a combination thereof. In some aspects, the identification information is conveyed using at least one of: an explicit identifier included in the one or more SSBs, one or more signal parameters of the one or more SSBs, a timing offset of the one or more SSBs, a periodicity of the one or more SSBs, or a combination thereof.

In some aspects, the identification information is not a PCI of the first TRP and is not a beam identifier associated with the first TRP. In some aspects, the one or more SSBs are transmitted using a first beam configuration, of the first TRP, that is independent from a second beam configuration of the second TRP. In some aspects, an identifier, that identifies the first TRP and distinguishes the first TRP from the second TRP, is included in the measurement report.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   measuring one or more synchronization signal blocks (SSBs);
   determining that the one or more SSBs are associated with a first transmit receive point (TRP) based at least in part on identification information, associated with the one or more SSBs, that distinguishes the first TRP from a second TRP with a same physical cell identifier (PCI) as the first TRP, wherein the identification information is determined based at least in part on one or more signal parameters of the one or more SSBs; and
   transmitting a measurement report, associated with the first TRP, based at least in part on measuring the one or more SSBs and determining that the one or more SSBs are associated with the first TRP.

2. The method of claim 1, wherein the identification information is determined further based at least in part on an explicit identifier included in the one or more SSBs.

3. The method of claim 1, wherein the identification information is determined further based at least in part on one or more of:
   a timing offset of the one or more SSBs,
   a periodicity of the one or more SSBs, or
   a combination thereof.

4. The method of claim 1, wherein the identification information is not a PCI of the first TRP and is not a beam identifier associated with the first TRP.

5. The method of claim 1, wherein an identifier, that identifies the first TRP and distinguishes the first TRP from the second TRP, is included in the measurement report.

6. The method of claim 5, wherein the identifier and the PCI are included in the measurement report.

7. The method of claim 1, wherein the measurement report is a first measurement report; and wherein a second measurement report, associated with the second TRP, is transmitted based at least in part on measuring one or more other SSBs associated with the second TRP.

8. The method of claim 1, wherein the UE is configured to transmit the measurement report associated with the first TRP based at least in part on receiving an indication to separately report SSB measurements, corresponding to different TRPs, for the PCI.

9. The method of claim 1, wherein the UE is configured to transmit, in a UE capability report, an indication of whether the UE supports separate measuring and separate reporting of SSB measurements for different TRPs with a same PCI.

10. A method of wireless communication performed by a base station, comprising:
    generating one or more synchronization signal blocks (SSBs), associated with a first transmit receive point (TRP), to convey identification information for the first TRP, wherein the identification information distinguishes the first TRP from a second TRP with a same physical cell identifier (PCI) as the first TRP, wherein the identification information is conveyed using one or more signal parameters of the one or more SSBs;
    transmitting the one or more SSBs associated with the first TRP;
    configuring a user equipment (UE) to measure and report the one or more SSBs; and
    receiving, from the UE, a measurement report associated with the first TRP based at least in part on transmitting the one or more SSBs and configuring the UE to measure and report the one or more SSBs.

11. The method of claim 10, wherein the identification information is conveyed further using an explicit identifier included in the one or more SSBs.

12. The method of claim 10, wherein the identification information is conveyed further using one or more of:

a timing offset of the one or more SSBs,
a periodicity of the one or more SSBs, or
a combination thereof.

13. The method of claim 10, wherein the identification information is not a PCI of the first TRP and is not a beam identifier associated with the first TRP.

14. The method of claim 10, wherein the one or more SSBs are transmitted using a first beam configuration, of the first TRP, that is independent from a second beam configuration of the second TRP.

15. The method of claim 10, wherein an identifier, that identifies the first TRP and distinguishes the first TRP from the second TRP, is included in the measurement report.

16. A user equipment (UE) for wireless communication, comprising:
    a memory; and
    one or more processors operatively coupled to the memory, the memory and the one or more processors configured to:
        measure one or more synchronization signal blocks (SSBs);
        determine that the one or more SSBs are associated with a first transmit receive point (TRP) based at least in part on identification information, associated with the one or more SSBs, that distinguishes the first TRP from a second TRP with a same physical cell identifier (PCI) as the first TRP, wherein the identification information is determined based at least in part on one or more signal parameters of the one or more SSBs; and
        transmit a measurement report, associated with the first TRP, based at least in part on measuring the one or more SSBs and determining that the one or more SSBs are associated with the first TRP.

17. The UE of claim 16, wherein the identification information is determined further based at least in part on an explicit identifier included in the one or more SSBs.

18. The UE of claim 16, wherein the identification information is determined further based at least in part on one or more of:
    a timing offset of the one or more SSBs,
    a periodicity of the one or more SSBs, or
    a combination thereof.

19. The UE of claim 16, wherein the identification information is not a PCI of the first TRP and is not a beam identifier associated with the first TRP.

20. The UE of claim 16, wherein an identifier, that identifies the first TRP and distinguishes the first TRP from the second TRP, is included in the measurement report.

21. The UE of claim 16, wherein the measurement report is a first measurement report; and wherein a second measurement report, associated with the second TRP, is transmitted based at least in part on measuring one or more other SSBs associated with the second TRP.

22. The UE of claim 16, wherein the UE is configured to transmit the measurement report associated with the first TRP based at least in part on receiving an indication to separately report SSB measurements, corresponding to different TRPs, for the PCI.

23. The UE of claim 16, wherein the UE is configured to transmit, in a UE capability report, an indication of whether the UE supports separate measuring and separate reporting of SSB measurements for different TRPs with a same PCI.

24. An apparatus for wireless communication, comprising:
    means for measuring one or more synchronization signal blocks (SSBs);
    means for determining that the one or more SSBs are associated with a first transmit receive point (TRP) based at least in part on identification information, associated with the one or more SSBs, that distinguishes the first TRP from a second TRP with a same physical cell identifier (PCI) as the first TRP, wherein the identification information is determined based at least in part on one or more signal parameters of the one or more SSBs; and
    means for transmitting a measurement report, associated with the first TRP, based at least in part on measuring the one or more SSBs and determining that the one or more SSBs are associated with the first TRP.

25. The apparatus of claim 24, wherein the identification information is determined further based at least in part on at least one of:
    an explicit identifier included in the one or more SSBs,
    a timing offset of the one or more SSBs,
    a periodicity of the one or more SSBs, or
    a combination thereof.

26. The apparatus of claim 24, wherein the identification information is not a PCI of the first TRP and is not a beam identifier associated with the first TRP.

27. The apparatus of claim 24, wherein an identifier, that identifies the first TRP and distinguishes the first TRP from the second TRP, is included in the measurement report.

28. The apparatus of claim 27, wherein the identifier and the PCI are included in the measurement report.

29. The apparatus of claim 24, wherein the apparatus is configured to transmit the measurement report associated with the first TRP based at least in part on receiving an indication to separately report SSB measurements, corresponding to different TRPs, for the PCI.

30. The apparatus of claim 24, wherein the apparatus is configured to transmit, in a UE capability report, an indication of whether the UE supports separate measuring and separate reporting of SSB measurements for different TRPs with a same PCI.

* * * * *